(12) United States Patent
West et al.

(10) Patent No.: US 6,848,414 B2
(45) Date of Patent: Feb. 1, 2005

(54) INJECTION CONTROL FOR A COMMON RAIL FUEL SYSTEM

(75) Inventors: James A. West, Simpsonville, SC (US); James E. McCarthy, Jr., Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 122 days.

(21) Appl. No.: 10/214,550

(22) Filed: Aug. 8, 2002

(65) Prior Publication Data

US 2004/0025849 A1 Feb. 12, 2004

(51) Int. Cl.⁷ .................................................. F02B 3/00
(52) U.S. Cl. ...................................... 123/299; 123/456
(58) Field of Search .............................. 123/299, 456, 123/447, 300, 486

(56) References Cited

U.S. PATENT DOCUMENTS

| | | | |
|---|---|---|---|
| 5,884,602 A | 3/1999 | Friedrich et al. | |
| 6,125,823 A | * 10/2000 | Thomas | 123/464 |
| 6,192,863 B1 | * 2/2001 | Takase | 123/456 |
| 6,453,874 B1 | * 9/2002 | Duffy et al. | 123/446 |
| 6,484,689 B1 | 11/2002 | Hasegawa | |
| 6,516,782 B1 | * 2/2003 | Thomas | 123/436 |
| 6,584,953 B2 | 7/2003 | Yomogida | |

FOREIGN PATENT DOCUMENTS

| | | |
|---|---|---|
| JP | 2001-164976 | 6/2001 |
| WO | 03/069146 | 8/2003 |

* cited by examiner

Primary Examiner—Mahmoud Gimie
(74) Attorney, Agent, or Firm—Brooks Kushman P.C.

(57) ABSTRACT

A system and method for controlling multiple fuel injections during a single combustion cycle for a multiple cylinder internal combustion engine having a common rail fuel distribution system determine the beginning of injection for the pilot and main injections based on crankshaft position while post injections are based on the main injection timing and an injector turn off delay determined using actual rail pressure. A rail pressure setpoint is determined based on current engine operating conditions including one or more fluid temperatures and current operating mode to provide more accurate injection control.

39 Claims, 5 Drawing Sheets

INJECTION CONTROL FOR A COMMON RAIL FUEL SYSTEM

BACKGROUND OF THE INVENTION

1. Field of the Invention

The present invention relates to a system and method for controlling fuel injection of a common rail fuel system in a multi-cylinder internal combustion engine.

2. Background Art

Common rail fuel systems are used in various types of internal combustion engines, such as diesel engines, for example. An accumulator or rail is used to distribute fuel to injectors or nozzles associated with each cylinder of the engine. An engine control module communicates with various engine components including one or more fuel pumps and fuel injectors to meter the fuel delivered to each cylinder, i.e. control the quantity and timing of the fuel delivery to ultimately control the performance and emissions of the engine.

A number of strategies have been developed to control fuel injection in an attempt to improve engine performance and fuel economy while reducing emissions. One such strategy employs multiple fuel injections during a single combustion cycle. Depending upon the particular application and operating conditions, the fuel injection for a single combustion cycle may be split into a pilot injection, a main injection, and one or more post injections, for example. The quantity and timing of each injection should be accurately controlled to achieve the intended benefits of using multiple injections, particularly for the pilot and post injections because of their relatively smaller volumes and short durations. However, many factors affect the injection events, such as common rail fuel pressure and injector energizing time, for example, making this a difficult task to accomplish. One prior art control strategy used for conventional fuel systems employing electronic unit injectors (EUIs) determines the beginning of injection for the main injection based on the-beginning of injection time and the duration of the pilot injection. While this strategy is acceptable for conventional EUI systems, for a common rail system the durations of the pilot and post injections are a function of the fuel pressure within the common rail and are therefore difficult to accurately control.

The present inventors have recognized various shortcomings of the prior art approaches and have developed a system and method for controlling multiple fuel injections for common rail fuel systems that is believed to provide more accurate control, particularly during transient operating conditions, which may contribute to improved engine performance and fuel economy while reducing emissions.

DISCLOSURE OF THE INVENTION

The present invention provides a system and method for controlling multiple fuel injections during a single combustion cycle for a multiple cylinder internal combustion engine having a common rail fuel distribution system with the beginning of injection for the pilot and main injections based on crankshaft position while post injections are based on the main injection timing and an injector turn on delay and/or turn off delay determined using actual rail pressure. A rail pressure setpoint is determined based on current engine operating conditions including one or more fluid temperatures and current operating mode to provide more accurate injection control.

The present invention also includes computer readable storage media having stored instructions executable by a computer to control multiple fuel injections during a single combustion cycle for a multiple cylinder internal combustion engine having a common rail fuel distribution system with the beginning of injection for the pilot and main injections based on crankshaft position while post injections are based on the main injection timing and an injector turn on delay and/or turn off delay determined using actual rail pressure. The computer readable storage media may also include instructions for determining a rail pressure setpoint based on current engine operating conditions including engine operating mode and one or more fluid temperatures.

The present invention provides a number of advantages. For example, the present invention controls the injection timing for pilot and main injections based on crankshaft position rather than allowing the main timing to be a function of actual rail pressure through pilot injection timing, energizing time, and pilot-to-main injection gap. This provides better control of the relatively smaller quantity and shorter duration pilot injection and more consistent main injections. In addition, the present invention provides a strategy that is generally easier to calibrate and provides more precise control of the actual beginning of injection, particularly for the main injection when multiple injection mode is active.

Various other advantages and features of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
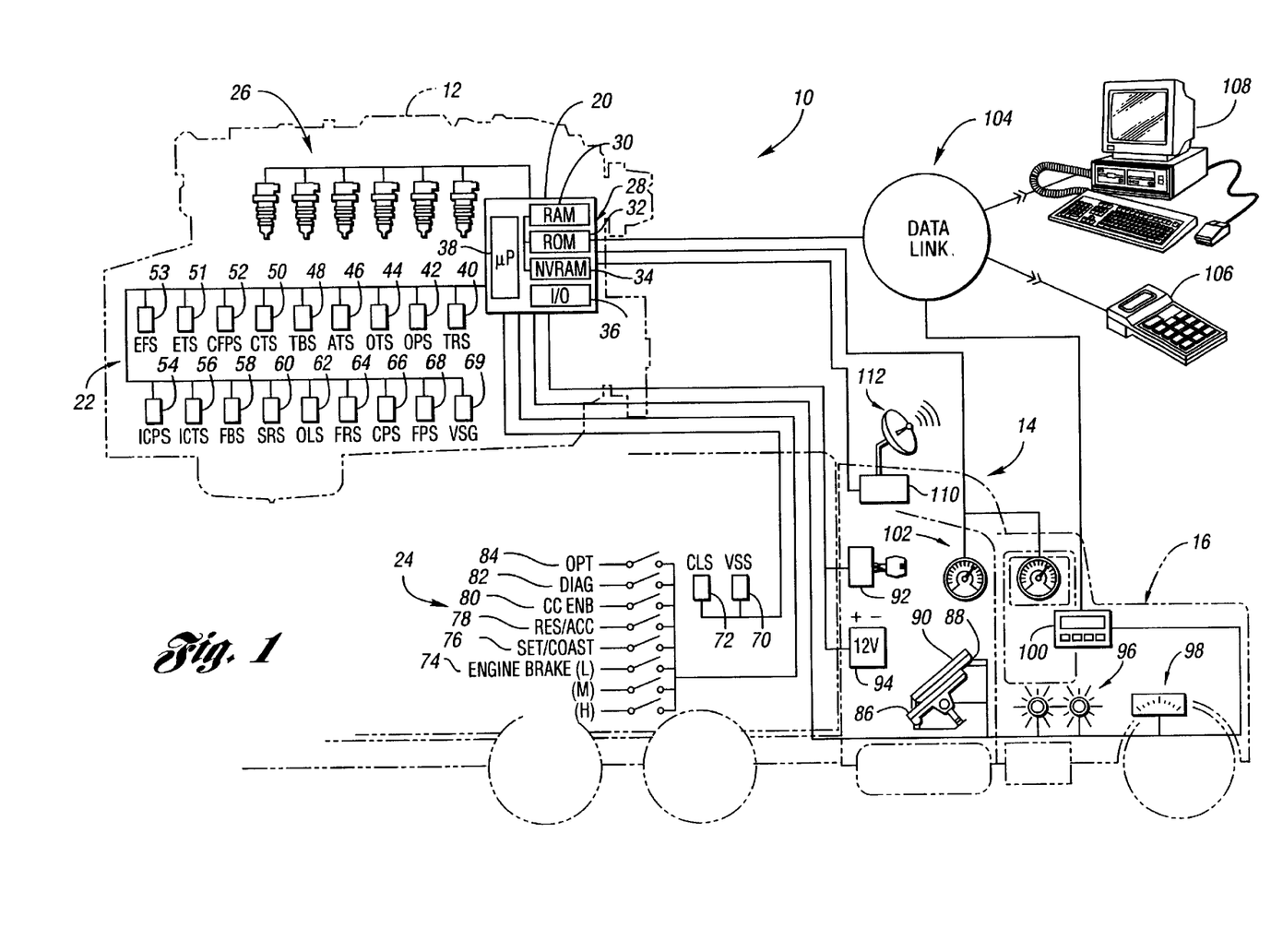
FIG. 1 is a schematic/block diagram illustrating operation of a system or method for controlling multiple fuel injections during a single combustion cycle for a common rail fuel system of an internal combustion engine according to one embodiment of the present invention.

FIG. 1 provides a schematic/block diagram illustrating operation of a system or method for controlling multiple fuel injections for an internal combustion engine having a common rail fuel distribution system according to one embodiment of the present invention. As will be appreciated by those of ordinary skill in the art, the multiple fuel injections include what is typically referred to as a main injection in addition to a pilot injection occurring before the main injection and/or one or more post injections occurring after the main injection. While the main injection is generally a longer duration injection that delivers a fuel quantity greater than the pilot and post injections, the principles of the present invention apply to other applications and operating conditions regardless of the relative durations of the injection events and corresponding quantities of fuel delivered.

Representative system 10 includes a multi-cylinder compression ignition internal combustion engine, such as a diesel engine 12, which may be installed in a vehicle 14 depending upon the particular application. In one embodiment, vehicle 14 includes a tractor/semi-trailer 16. Diesel engine 12 is installed in tractor/semi-trailer 16 and interfaces with various sensors and actuators located on engine 12, and tractor/semi-trailer 16 via engine and vehicle wiring harnesses. In other applications, engine 12 may be used to operate industrial and construction equipment, or in stationary applications for driving generators, compressors, and/or pumps and the like.

An electronic engine control module (ECM) 20 receives signals generated by engine sensors 22 and vehicle sensors 24 and processes the signals to control engine and/or vehicle actuators such as fuel injectors 26, for example. ECM 20 preferably includes computer-readable storage media, indicated generally by reference numeral 28 for storing data representing instructions executable by a computer to control engine 12, and in particular the timing and quantity of fuel injected into the cylinders in accordance with the present invention. Computer-readable storage media 28 may also include calibration information in addition to working variables, parameters, and the like. In one embodiment, computer-readable storage media 28 include a random access memory (RAM) 30 in addition to various non-volatile memory such as read-only memory (ROM) 32, and non-volatile memory (NVRAM) 34. Computer-readable storage media 28 communicate with a microprocessor 38 and input/output (I/O) circuitry 36 via a standard control/address bus. As will be appreciated by one of ordinary skill in the art, computer-readable storage media 28 may include various types of physical devices for temporary and/or persistent storage of data which includes solid state, magnetic, optical, and/or combination devices. For example, computer readable storage media 28 may be implemented using one or more physical devices such as DRAM, PROMS, EPROMS, EEPROMS, flash memory, and the like. Depending upon the particular application, computer-readable storage media 28 may also include floppy disks, CD ROM, DVD, and the like.

In a typical application, ECM 20 processes inputs from engine sensors 22, and vehicle sensors/switches 24 by executing instructions stored in computer-readable storage media 28 to generate appropriate output signals for control of engine 12 via corresponding actuators. In one embodiment of the present invention, engine sensors 22 include a timing reference sensor (TRS) 40 which provides an indication of the crankshaft position and may be used to determine engine speed, preferably in revolutions per minute (rpm). As described in greater detail below, the crankshaft position is also preferably used to determine the beginning of injection (BOI) for the pilot injection (when active) and the main injection. An oil pressure sensor (OPS) 42 and oil temperature sensor (OTS) 44 are used to monitor the pressure and temperature of the engine oil, respectively.

An air temperature sensor (ATS) 46 is used to provide an indication of the current intake or ambient air temperature. A turbo boost sensor (TBS) 48 is used to provide an indication of the boost pressure of a turbocharger which is preferably a variable geometry or variable nozzle turbocharger. As known by those of ordinary skill in the art, TBS 48 may also be used to provide an indication of the intake manifold pressure. Coolant temperature sensor (CTS) 50 is used to provide an indication of the coolant temperature. One or more fluid temperatures, such as the oil temperature, air temperature, coolant temperature, and the like may be used to determine a desired rail pressure set point as described in greater detail with reference to FIG. 2.

Depending upon the particular engine configuration and application, various additional sensors may be included. For example, engines which utilize exhaust gas recirculation (EGR) preferably include an EGR temperature sensor (ETS) 51 and an EGR flow sensor (EFS) 53.

Common rail fluid distribution systems may include one or more pressure sensors to detect the pressure within the common rail and provide a corresponding signal to the pressure controller within the ECM 20. As previously described, common rail systems may be used to distribute fuel to the fuel injectors that are controlled by ECM 20. The common rail fuel system preferably includes a corresponding fuel pressure sensor (CFPS) 52. Similarly, an intercooler coolant pressure sensor (ICPS) 54 and temperature sensor (ICTS) 56 may be provided to sense the pressure and temperature of the intercooler coolant. Engine 12 also preferably includes a fuel temperature sensor (FTS) 58 and a synchronous reference sensor (SRS) 60. SRS 60 provides an indication of a specific cylinder in the firing order for engine 12. This sensor may be used to coordinate or synchronize control of a multiple-engine configuration such as used in some stationary generator applications.

Engine 12 may also include an oil level sensor (OLS) 62 to provide various engine protection features related to a low oil level. A fuel restriction sensor (FRS) 64 may be used to monitor a fuel filter and provide a warning for preventative maintenance purposes. A fuel pressure sensor (FPS) 68 provides an indication of fuel pressure to warn of impending power loss and engine fueling. Similarly, a crankcase pressure sensor (CPS) 66 provides an indication of crankcase pressure which may be used for various engine protection features by detecting a sudden increase in crankcase pressure indicative of an engine malfunction.

System 10 preferably includes various vehicle sensors/switches 24 to monitor vehicle operating parameters and driver input used in controlling vehicle 14 and engine 12. For example, vehicle sensors/switches 24 may include a vehicle speed sensor (VSS) 70, which provides an indication of the current vehicle speed. A coolant level sensor (CLS) 72 monitors the level of engine coolant in a vehicle radiator. Switches used to select an engine operating mode or otherwise control operation of engine 12 or vehicle 14 may include an engine braking selection switch 74 which preferably provides for low, medium, high, and off selections, cruise control switches 76, 78, and 80, a diagnostic switch 82, and various optional, digital, and/or analog switches 84, such as a high idle switch, for example. ECM 20 also receives signals associated with an accelerator or foot pedal 86, a clutch 88, and a brake 90. ECM 20 may also monitor position of a key switch or ignition switch 92 and a system voltage provided by a vehicle battery 94 to determine current operating conditions and control engine 12 and/or vehicle 14.

ECM 20 may communicate with various vehicle output devices such as status indicators/lights 96, analog displays 98, digital displays 100, and various analog/digital gauges 102. In one embodiment of the present invention, ECM 20 utilizes an industry standard data link 104 to broadcast various status and/or control messages which may include engine speed, accelerator pedal position, vehicle speed, and the like. Preferably, data link 104 conforms to SAE J1939 and SAE J1587 to provide various service, diagnostic, and control information to other engine systems, subsystems, and connected devices such as display 100. Preferably, ECM 20 includes control logic to determine current engine and ambient operating conditions to select corresponding gains for a PID and/or feed forward pressure controller to control the pressure within one or more common rail fluid distribution systems. As described in greater detail with reference to FIG. 2, ECM 20 preferably determines at least a current operating mode, oil temperature and engine speed to determine a desired rail pressure setpoint. The rail pressure setpoint may then be used by a suitable rail pressure controller or governor within ECM 20 to control one or more fuel pumps to supply the desired common rail pressure. One such controller is described in commonly owned and copending U.S. Ser. No. 10/214, 521 titled "System and Method for Common Rail Pressure Control" the disclosure of which is hereby incorporated by reference in its entirety.

A service tool 106 may be periodically connected via data link 104 to program selected parameters stored in ECM 20 and/or receive diagnostic information from ECM 20. Likewise, a computer 108 may be connected with the appropriate software and hardware via data link 104 to transfer information to ECM 20 and receive various information relative to operation of engine 12, and/or vehicle 14. Similarly, transceiver 110 and antenna 112 may be used to wirelessly send and/or receive program, diagnostic, or other information.

Block diagrams illustrating operation of one embodiment for a system or method for controlling multiple fuel injections in a common rail fluid distribution system according to the present invention are shown in FIGS. 2–5. As will be appreciated by one of ordinary skill in the art, the block diagrams represent control logic which may be implemented or effected in hardware, software, or a combination of hardware and software. The various functions are preferably effected by a programmed microprocessor, such as included in the DDEC controller manufactured by Detroit Diesel Corporation, Detroit, Michigan. Of course, control of the engine/vehicle and/or associated components may include one or more functions implemented by dedicated electric, electronic, or integrated circuits or controllers. As will also be appreciated by those of skill in the art, the control logic may be implemented using any of a number of known programming and processing techniques or strategies and is not limited to the particular order or sequence illustrated. For example, interrupt or event driven processing is typically employed in real-time control applications, such as control of an engine or vehicle rather than a purely sequential strategy as illustrated. Likewise, parallel processing, multitasking, or multi-threaded systems and methods may be used to accomplish the objectives, features, and advantages of the present invention. The invention is independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the features and advantages of the present invention. The illustrated functions may be modified, or in some cases omitted, without departing from the spirit or scope of the present invention.

In various embodiments of the present invention, the control logic illustrated is implemented primarily in software and is stored in computer readable storage media within the ECM. As one of ordinary skill in the art will appreciate, various control parameters, instructions, and calibration information stored within the ECM may be selectively modified by the vehicle owner/operator while other information is restricted to authorized service or factory personnel. The computer readable storage media may also be used to store engine/vehicle operating information and diagnostic information. Although not explicitly illustrated, various steps or functions are repeatedly performed depending on the particular function and the type of processing employed.

Figure 2:
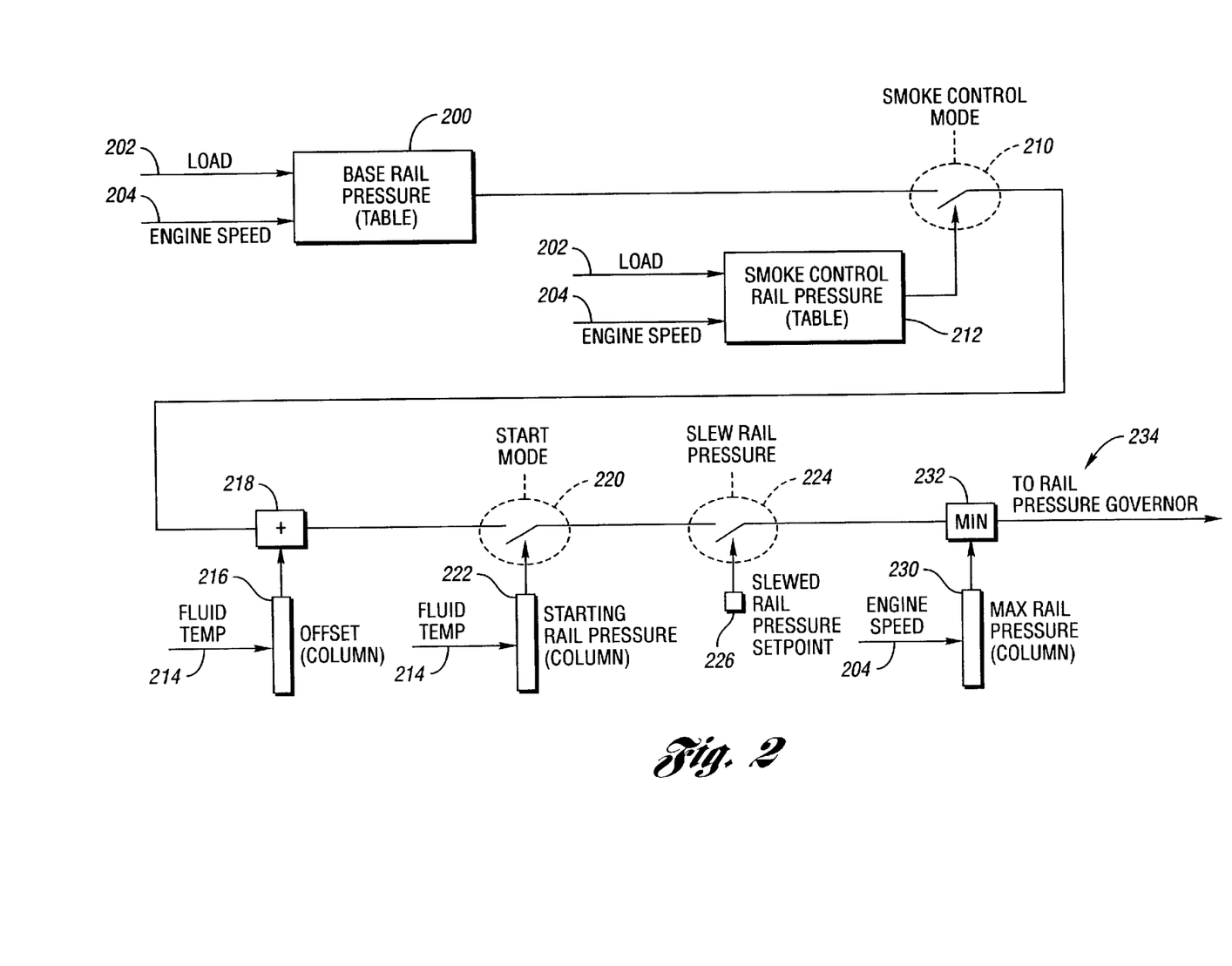
FIG. 2 is a block diagram illustrating determination of a rail pressure setpoint according to one embodiment of the present invention.

The block diagram of FIG. 2 illustrates one embodiment for determining a rail pressure setpoint according to the present invention. In this embodiment, a base rail pressure 200 is determined based on engine load 202 and engine speed 204. The base rail pressure is preferably stored in a two-dimensional lookup table. A software switch determines if smoke control mode 210 is active based on current engine and ambient operating conditions. When smoke control mode is activated, the smoke control mode rail pressure table 212 determines the base rail pressure setpoint using engine load 202 and engine speed 204. The beginning rail pressure accessed from the base rail pressure setpoint table 200 or the smoke control rail pressure setpoint table 212 may then be adjusted by a temperature offset 216, preferably stored in a single column accessed by a fluid temperature 214. The fluid temperature may be any appropriate fluid temperature indicative of engine or ambient operating conditions. For example, coolant temperature, oil temperature, or air temperature may be used alone or in combination. As with many of the other engine and ambient operating parameters, the fluid temperature may be provided by a designated temperature sensor or may be inferred from other operating parameters or sensors depending upon the particular application.

The adjusted rail pressure setpoint may be replaced by either a start mode rail pressure setpoint or a slewing mode rail pressure setpoint depending upon the status of corresponding software switches 220 and 224, respectively. Starting mode rail pressure setpoint 222 is preferably stored in a single column or one-dimensional lookup table indexed by fluid temperature 214 and is used during starting of the engine. In one preferred embodiment, the same fluid temperature is used to access the temperature offset table 216 and the starting rail pressure setpoint table 222. Of course, different fluid temperatures may be used if desired. Similarly, a slewed rail pressure setpoint 226, if present, takes priority over other operating modes to determine the desired rail pressure setpoint. A slewed rail pressure setpoint may be provided by another controller or a technician via a communications interface, for example.

A maximum rail pressure 230, preferably stored in a one-dimensional lookup table accessed based on engine speed 204, is used by a minimum comparison function 232 to limit the maximum allowable rail pressure setpoint. The resulting rail pressure setpoint is then provided to a rail pressure controller or governor as represented by reference 234.

Figure 3:
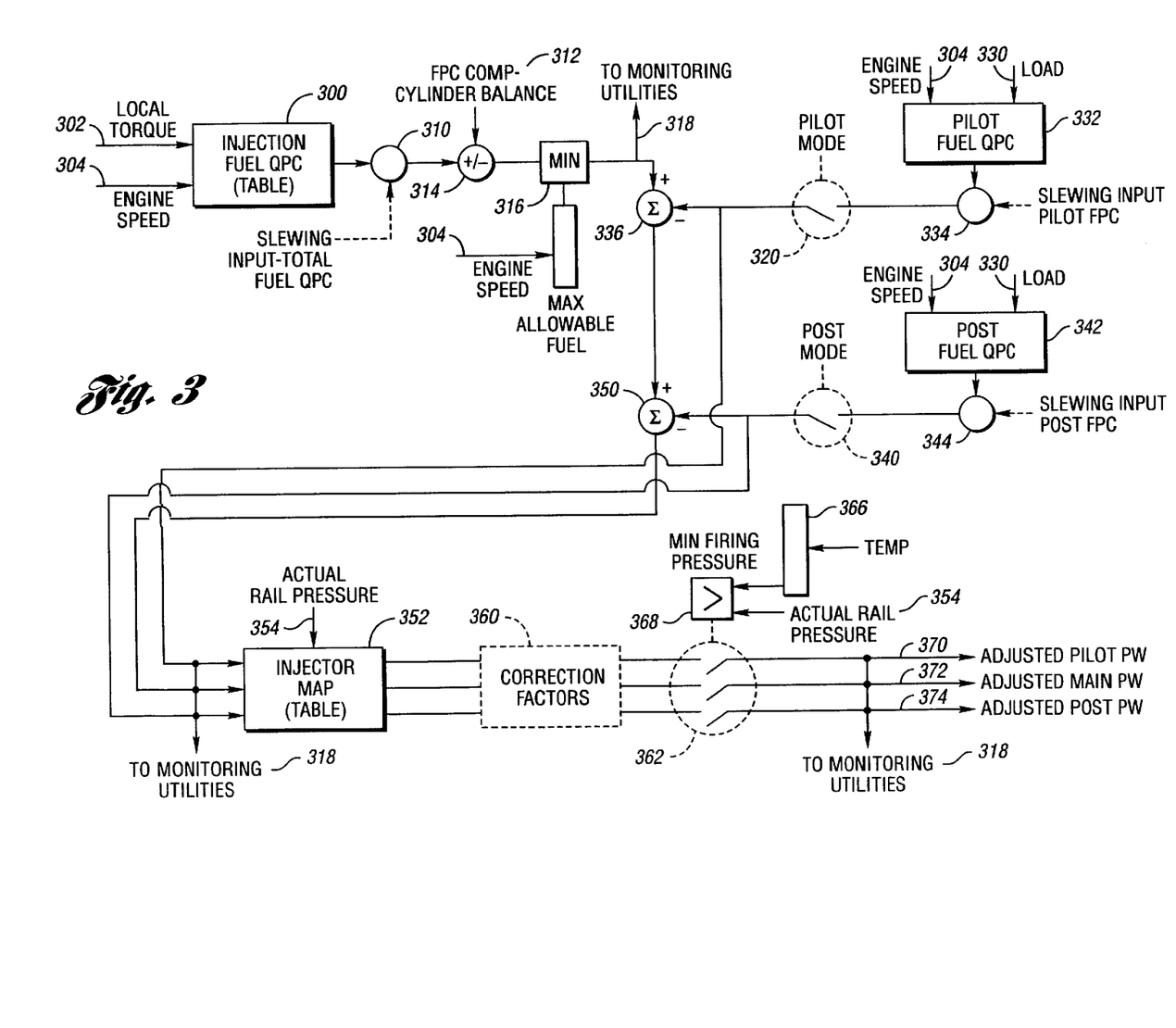
FIG. 3 is a block diagram illustrating fuel metering control for multiple fuel injections according to one embodiment of the present invention.

A block diagram illustrating fuel metering control for multiple fuel injections according to one embodiment of the present invention is shown in FIG. 3. An injection fuel quantity per cycle (QPC or FPC) is determined as represented by block 300. The total fuel per cycle is used to determine the total fuel injected per cylinder per cycle. The total injected fuel per cycle is preferably stored in a two-dimensional lookup table accessed by local torque 302 and engine speed 304. In this embodiment, local torque is determined using various lookup tables as a function of a variety of engine operating parameters such as throttle pedal position, air temperature, turbo boost, operating mode, and the like. A slewing input 310, when present, may replace the injection total fuel quantity per cycle. As described above with reference to FIG. 2, a slewing input may be provided by another controller, or a command received over a communications interface, for example.

The injection fuel quantity per cycle may then be adjusted to perform cylinder balancing as represented by reference 312 with an appropriate amount of fuel added or subtracted as indicated at block 314. The cylinder balancing function attempts to balance the power output of each cylinder taking into account current operating conditions and variation in engine components, such as fuel injectors, for example. A minimum function represented by block 316 is used to limit the fuel to a maximum allowable amount based on engine speed 304. The maximum allowable fuel is preferably stored in a one-dimensional lookup table accessed using the engine speed. Monitoring utilities 318 provide an additional check to detect any errors in the calculation of the total injected fuel per cycle.

The total injected fuel per cycle may be divided into multiple injections when pilot and/or post injection modes are activated. The pilot and post fuel quantities are taken from the total fuel per cycle leaving the remaining fuel for the main injection. For example, when pilot injection mode is activated as represented by software switch 320, a pilot fuel quantity per cycle is determined using table 332 based on engine load 330 and engine speed 304, or alternatively via stewing input 334. The pilot quantity of fuel per cycle is taken from the previously determined total injected fuel quantity per cycle as represented by block 336 with the remaining fuel allocated to the main injection or post injection(s) as described below. In addition, the pilot fuel quantity per cycle is monitored by monitoring utilities 318 before determining an injector pulse width using injector map 352.

In a similar fashion, one or more post fuel injections may be activated based on a software switch 340. The post fuel quantity per cycle is determined using a lookup table 342 based on engine speed 304 and load 330 or, alternatively based on a slewing input 344. The post fuel quantity per cycle is also taken from the total fuel per cycle as represented by block 350 with the remaining fuel (usually the majority of the total fuel per cycle) allocated to the main injection fuel quantity per cycle. In addition, the post fuel quantity per cycle and the resulting main injection fuel quantity per cycle are monitored by monitoring utilities 318 before being used to determine corresponding injector pulse widths using injector map 352.

Injector map 352 is used to convert the fuel quantity per cycle for the pilot injection, main injection, and one or more post injections to a corresponding pulse width or injector energizing time based on actual rail pressure 354. Correction factors 360 may be applied to the determined pulse widths to provide additional calibration flexibility and account for component variation, such as injector variation, for example. A software switch 362 is used to determine whether or not to fire each of the multiple injections. One or more fluid temperatures 366 are used to determine a minimum firing pressure which is then compared to the actual rail pressure 354 at block 368. As described above, the fluid temperatures may include oil temperature, air temperature, coolant temperature, or the like. The cycle adjusted pulse widths are then checked using monitoring utilities 318 and may be adjusted or inhibited as necessary. Otherwise, the adjusted pilot pulse width 370, the adjusted main pulse width 372 and one or more adjusted post pulse widths 374 are converted by an appropriate driver to an injector current to open the injector needle and inject the corresponding quantities of fuel into the cylinder with the beginning of injection timing determined as described and illustrated with respect to FIGS. 4A–4C.

Figure 4A:
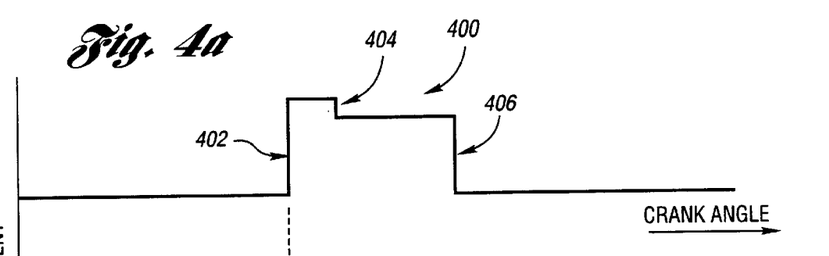
FIGS. 4A–4C are timing diagrams illustrating injector current and corresponding injector needle motion for representative injection events according to one embodiment of the present invention.
Figure 4B:
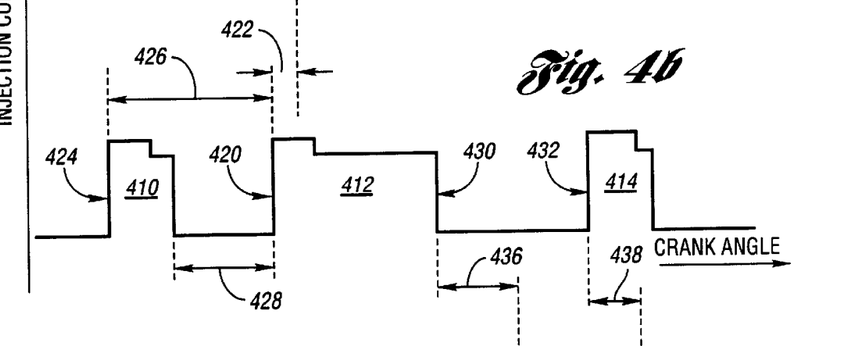
Figure 4C:
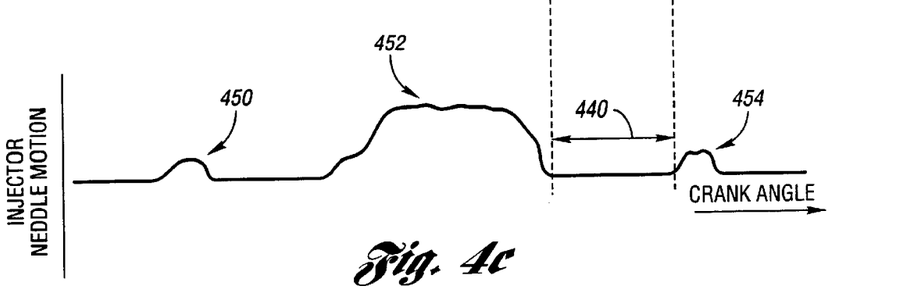

FIGS. 4A–4C are timing diagrams illustrating injector current and corresponding injector needle motion for representative injection events according to one embodiment of the present invention. FIG. 4A illustrates injector current as a function of crankshaft position for a single injection event 400. Injector current rises at the beginning of injection (BOI) 402 to a peak pull-in current that is subsequently reduced to a holding current at 404 for the duration of the pulse width with the end of energization (EOE) represented by 406. Actual delivery of fuel to the cylinder corresponds to the mechanical movement of the injector needle and will slightly lag the injector current as illustrated and described with reference to FIGS. 4B and 4C.

FIG. 4B illustrates multiple injection events for a single cylinder during a single combustion cycle. In this example, the multiple injection events include a first (pilot) injection 410, a second (main) injection 412, and a third (post) injection 414. Corresponding injector needle motion is illustrated in FIG. 4C for pilot injection 450, main injection 452, and post injection 454. As illustrated in this example, the pilot and post fuel injection quantities are about the same with the main injection quantity being relatively larger. However, as stated above, the present invention is independent of the relative quantities of fuel injected during the first and subsequent injection events. When pilot injection mode is active, the beginning of injection (BOI) for the main injection is preferably adjusted or offset from the crank angle position that it would otherwise be if multiple injections were not activated as represented by 422. The amount of this timing adjustment or offset is preferably stored in a two-dimensional lookup table indexed by engine speed and load. Representative values for the timing adjustment range from –10 to 10 degrees of crankshaft angular position with a half degree resolution, for example. The adjusted beginning of injection 420 for main injection 412 is then used to calculate the beginning of injection 424 for the pilot injection 410 based on the pilot advance 426. The value for the pilot advance is preferably stored in a two-dimensional lookup table indexed by engine speed and load with representative values ranging from 0 to 50 degrees with a half degree resolution, for example. It should be noted that the beginning of injection for both the pilot injection 410 and the main injection 412 are determined based on crankshaft position, i.e. angular degrees of rotation of the crankshaft relative to a reference position as opposed to determining the main injection timing based on the pulse width of the pilot injection. The gap between the end of energization of the pilot pulse and the beginning of injection of the main pulse is represented by reference numeral 428. If the gap between pilot pulse 410 and main pulse 412 is less than a calibratable amount stored in a lookup table, the pilot pulse 410 is inhibited with the main pulse adjusted accordingly as illustrated and described with reference to FIG. 5.

The beginning of energization 432 of post injection 414 is determined using the end of energization 430 of main pulse 412 using calibratable parameters as illustrated in FIGS. 4B and 4C. These parameters capture the electromechanical characteristics of the injectors with respect to the delay between electrical energization of the injector solenoid and the mechanical injector needle motion. As illustrated, the mechanical motion of the injector needle lags the electrical energization of the injector solenoid with the delay dependent in part on the particular injector and the current common rail pressure. Needle lift turn on delays and turn off delays are a function of actual rail pressure. These parameters may be used to more accurately specify the actual beginning of injection as calibrated in the BOI tables. The turn on delay and/or turn off delay may be used for any one or more of the multiple injections depending upon the particular application. In the example illustrated in FIGS. 4B and 4C, parameters corresponding to an injector turn off delay 436, turn on delay 438, and post BOI gap 440 are used to control the post injection timing. Turn off delay 436 represents the time between the end of energization 430 and the end of the injector needle motion for main pulse 452. This parameter is preferably stored in a one-dimensional lookup table indexed by actual rail pressure. Similarly, turn on delay 438 represents the time between the beginning of energization 432 and the beginning of injector needle movement for post pulse 454. This parameter may also be stored in a one-dimensional lookup table indexed by actual rail pressure. In one preferred embodiment, this parameter is stored in one row of a two-dimensional lookup table, i.e. the zero fuel quantity row of injector map 352 illustrated in FIG. 3. The post BOI gap parameter may be stored in a one-dimensional lookup table indexed by engine speed.

Figure 5:
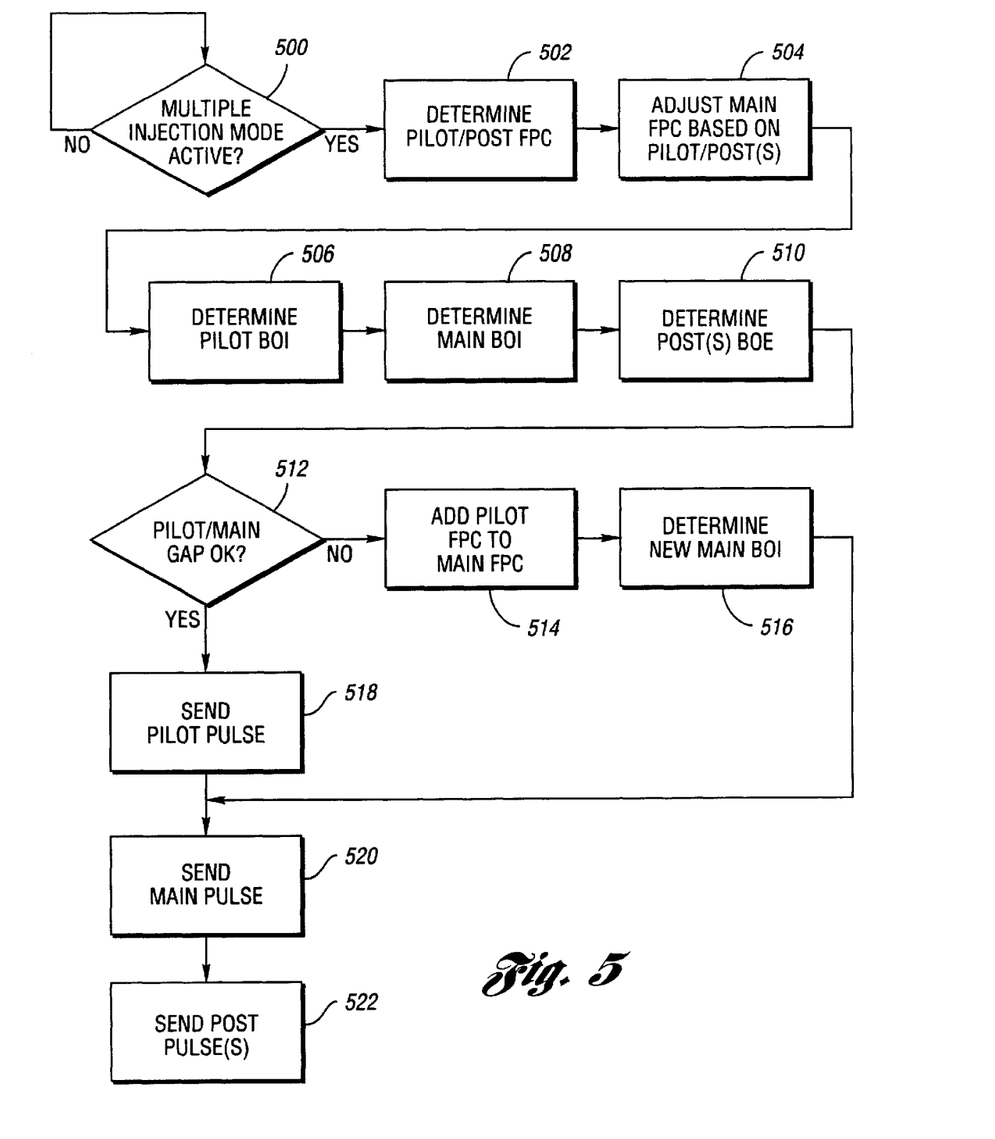
FIG. 5 is a flow chart illustrating operation of a system and method for controlling multiple fuel injections during a single combustion cycle for a common rail fuel system according to one embodiment of the present invention.

FIG. 5 is a flowchart illustrating operation of a system or method for controlling multiple fuel injections during a single combustion cycle of a single cylinder for a common rail fuel system according to one embodiment of the present invention. Block 500 determines whether one or more multiple injection modes are active. The multiple injection modes may include pilot mode and/or post mode. Various entry conditions, depending upon the particular application, must be met for these injection modes to be activated. Block 502 represents a determination of the quantity of fuel for the pilot and one or more post fuel injections. The base quantity of fuel for the main injection may then be adjusted using the quantities determined for the pilot and/or post fuel injections as represented by block 504. The injection timing for the pilot injection, main injection, and one or more post injections is then determined as represented by blocks 506, 508, and 510, respectively. Verification logic may then be used to determine whether the gap between the injections is acceptable as represented by block 512.

In the example illustrated, verification logic 512 determines whether the gap between the pilot and main pulse is acceptable. If the gap is acceptable, the quantity for the pilot injection is converted to an appropriate pulse width and the pilot pulse is sent to the injector as represented by block 518. If the gap is not acceptable, the fuel quantity allocated to the pilot injection is added to the quantity allocated for the main injection to prevent under fueling as represented by block 514. New timing for the main injection is then determined as represented by block 516 and the pilot pulse is inhibited. The main injection quantity and post injection quantity are converted to appropriate pulse widths before being sent to the injector as represented by blocks 520 and 522, respectively.

As described above, the present invention provides various systems and methods for more accurately controlling multiple injections for a single engine cylinder during a single combustion cycle for a common rail fuel distribution system. The invention may be used to improve performance and emissions for common rail systems and may lead to improved driveability in vehicle applications.

What is claimed is:

1. A method for controlling multiple fuel injections for a single cylinder during a combustion cycle of a multiple cylinder internal combustion engine having a common rail fuel distribution system, the method comprising:
   determining a quantity of fuel for a first injection;
   determining a quantity of fuel for a second injection;
   adjusting the quantity of fuel for the second injection based on the quantity of fuel determined for the first injection; and
   determining injection timing of the first and second injections based on crankshaft position.

2. The method of claim 1 wherein the step of determining injection timing comprises adjusting a beginning of injection for the second injection relative to the beginning of injection when only a single injection is performed.

3. The method of claim 2 wherein the beginning of injection for the second injection is adjusted based on current engine speed and load.

4. The method of claim 2 wherein the step of determining injection timing comprises determining a crankshaft angular position for beginning of injection of the first injection based on the adjusted beginning of injection for the second injection.

5. The method of claim 4 wherein the crankshaft angular position for the beginning of injection of the first injection is further determined based on current engine speed and load.

6. The method of claim 4 further comprising:
   inhibiting the first injection when a gap between end of energization of the first injection and beginning of injection of the second injection is less than a predetermined minimum gap.

7. The method of claim 4 further comprising:
   adding the quantity of fuel for the first injection to the quantity of fuel for the second injection and determining a new beginning of injection for the second injection when the first injection is inhibited.

8. The method of claim 1 further comprising:
   determining a quantity of fuel for a third injection;
   determining an injection timing gap for the third injection based on an end of end of energization of the second injection.

9. The method of claim 8 wherein the step of determining injection timing of the third injection further comprises:
   determining an injector needle delay; and
   determining a desired gap between the second and third injections.

10. The method of claim 9 wherein determining an injector needle delay comprises determining an injector needle delay based on current actual rail pressure.

11. The method of claim 9 wherein determining a desired gap comprises determining a desired gap based on current engine speed .

12. The method of claim 1 further comprising determining a desired rail pressure set point based on current engine operating conditions.

13. The method of claim 12 wherein determining a desired rail pressure set point comprises determining a desired rail pressure set point based on at least one current fluid temperature.

14. A computer readable storage medium having stored data representing instructions for controlling multiple fuel injections for a single cylinder during a combustion cycle of a multiple cylinder internal combustion engine having a common rail fuel distribution system, the computer readable storage medium comprising:

instructions for determining a quantity of fuel for a first injection;

instructions for determining a quantity of fuel for a second injection;

instructions for adjusting the quantity of fuel for the second injection based on the quantity of fuel determined for the first injection; and instructions for determining injection timing of the first and second injections based on crankshaft position.

15. The computer readable storage medium of claim 14 wherein the instructions for determining injection timing comprise instructions for adjusting a beginning of injection for the second injection relative to the beginning of injection corresponding to a single injection.

16. The computer readable storage medium of claim 15 wherein the beginning of injection for the second injection is adjusted based on current engine speed and load.

17. The computer readable storage medium of claim 15 wherein the instructions for determining injection timing comprise instructions for determining a crankshaft angular position for beginning of injection of the first injection based on the adjusted beginning of injection for the second injection.

18. The computer readable storage medium of claim 17 wherein the crankshaft angular position for the beginning of injection of the first injection is further determined based on current engine speed and load.

19. The computer readable storage medium of claim 17 further comprising:

instructions for inhibiting the first injection when a gap between end of energization of the first injection and beginning of injection of the second injection is less than a predetermined minimum gap.

20. The computer readable storage medium of claim 17 further comprising:

instructions for adding the quantity of fuel for the first injection to the quantity of fuel for the second injection and determining a new beginning of injection for the second injection when the first injection is inhibited.

21. The computer readable storage medium of claim 14 further comprising:

instructions for determining a quantity of fuel for a third injection;

instructions for determining injection timing of the third injection based on an end of end of energization of the second injection.

22. The computer readable storage medium of claim 21 wherein the instructions for determining injection timing of the third injection further comprises:

instructions for determining an injector needle delay; and instructions for determining a desired gap between the second and third injections.

23. The computer readable storage medium of claim 22 wherein the instructions for determining an injector needle delay comprise instructions for determining an injector needle delay based on current actual rail pressure.

24. The computer readable storage medium of claim 22 wherein the instructions for determining a desired gap comprise instructions for determining a desired gap based on current engine speed .

25. The computer readable storage medium of claim 14 further comprising instructions for determining a desired rail pressure set point based on current engine operating conditions.

26. The computer readable storage medium of claim 25 wherein the instructions for determining a desired rail pressure set point comprise instructions for determining a desired rail pressure set point based on at least one current fluid temperature.

27. A system for controlling multiple fuel injections for a single cylinder during a combustion cycle of a multiple cylinder internal combustion engine having a common rail fuel distribution system, the system comprising:

a plurality of electronically controlled fuel injectors each associated with an engine cylinder and fluidly coupled to the common rail fuel distribution system;

at least one pump for supplying fuel to, and modifying fuel pressure of the common rail fuel distribution system; and a controller in communication with the fuel injectors and the pump for determining a total quantity of fuel for injection based on local torque and engine speed, determining a quantity of fuel for a pilot injection based on engine load and engine speed, adjusting a quantity of fuel for a main injection based on the total quantity of fuel and the quantity of fuel for the pilot injection, and determining injection timing of the main injection and the pilot injection based on crankshaft position.

28. The system of claim 27 wherein the controller modifies the injection timing of the main injection relative to the injection timing corresponding to a single injection.

29. The system of claim 28 wherein the beginning of injection for the main injection is adjusted based on current engine speed and load.

30. The system of claim 28 wherein the controller determines a crankshaft angular position for beginning of injection of the pilot injection based on the adjusted beginning of injection for the main injection.

31. The system of claim 30 wherein the crankshaft angular position for the beginning of injection of the pilot injection is further determined based on current engine speed and load.

32. The system of claim 27 wherein the controller inhibits the pilot injection when a gap between end of energization of the pilot injection and beginning of injection of the main injection is less than a predetermined minimum gap.

33. The system of claim 32 wherein the controller adds the quantity of fuel for the pilot injection to the quantity of fuel for the main injection and determines a new beginning of injection for the main injection when the pilot injection is inhibited.

34. The system of claim 27 wherein the controller determines a quantity of fuel for at least one post injection and determines injection timing of the post injection based on an end of energization of the main injection.

35. The system of claim 34 wherein the controller determines injection timing of the post injection by:

determining an injector turn off delay;

determining an injector turn on delay; and determining a desired gap between the main and post injections.

36. The system of claim 35 wherein the controller determines an injector turn off delay based on current actual rail pressure.

37. The system of claim 35 wherein the controller determines a desired gap based on current engine speed .

38. The system of claim 27 wherein the controller determines a desired rail pressure set point based on current engine operating conditions.

39. The system of claim 38 wherein the controller determines a desired rail pressure set point based on at least one current fluid temperature.

* * * * *

UNITED STATES PATENT AND TRADEMARK OFFICE
CERTIFICATE OF CORRECTION

PATENT NO. : 6,848,414 B2
DATED : February 1, 2005
INVENTOR(S) : James A. West and James E. McCarthy, Jr.

It is certified that error appears in the above-identified patent and that said Letters Patent is hereby corrected as shown below:

Column 10,
Line 43, delete "of end".

Column 11,
Line 46, delete "of end".

Signed and Sealed this

Fifth Day of April, 2005

JON W. DUDAS
*Director of the United States Patent and Trademark Office*